US010272718B1

(12) United States Patent
Quan et al.

(10) Patent No.: US 10,272,718 B1
(45) Date of Patent: Apr. 30, 2019

(54) ROAD TUBELESS BICYCLE WHEEL

(71) Applicant: Knight Composites, LLC, Bend, OR (US)

(72) Inventors: Kevin Quan, Toronto (CA); David Bertozzi, Toronto (CA)

(73) Assignee: Knight Composites, LLC, Bend, OR (US)

(*) Notice: Subject to any disclaimer, the term of this patent is extended or adjusted under 35 U.S.C. 154(b) by 0 days.

(21) Appl. No.: 15/847,015

(22) Filed: Dec. 19, 2017

Related U.S. Application Data

(60) Provisional application No. 62/595,468, filed on Dec. 6, 2017.

(51) Int. Cl.
*B60B 21/10* (2006.01)
*B60B 21/02* (2006.01)
*B60B 21/04* (2006.01)

(52) U.S. Cl.
CPC .......... *B60B 21/104* (2013.01); *B60B 21/025* (2013.01); *B60B 21/04* (2013.01); *B60B 21/102* (2013.01)

(58) Field of Classification Search
CPC ....... B60B 21/00; B60B 21/02; B60B 21/025; B60B 21/026; B60B 21/04; B60B 21/10; B60B 21/104; B60B 21/106; B60C 15/02; B60C 15/0203
See application file for complete search history.

(56) References Cited

U.S. PATENT DOCUMENTS

| 446,189 | A | | 2/1891 | Overman | |
|---|---|---|---|---|---|
| 5,151,141 | A | * | 9/1992 | Lunieski | B60B 21/10 152/379.5 |
| 5,242,000 | A | * | 9/1993 | Kimura | B60C 15/02 152/379.3 |
| 6,138,730 | A | * | 10/2000 | Fotij | B21D 53/30 152/398 |
| 6,767,070 | B1 | * | 7/2004 | Chiang | B60B 1/041 301/58 |
| 7,219,707 | B2 | * | 5/2007 | Han | B60B 1/02 152/246 |
| 7,290,839 | B2 | * | 11/2007 | Okajima | B60B 1/0284 301/58 |
| 8,007,053 | B2 | * | 8/2011 | Koziatek | B60B 21/025 152/382 |
| 2008/0277998 | A1 | * | 11/2008 | Chen | B60B 1/041 301/95.104 |
| 2009/0115240 | A1 | * | 5/2009 | Slate | B60B 21/025 301/95.104 |

(Continued)

OTHER PUBLICATIONS

R&R Bikes, "SEBCO" rims, Jan. 31, 2002, viewed at http://www.rrbikes.com/rims.htm.

(Continued)

*Primary Examiner* — Jason R Bellinger
(74) *Attorney, Agent, or Firm* — Kolitch Romano LLP

(57) ABSTRACT

Road tubeless rims may include a pair of circumferential flanges having inner tire seating surfaces that are nonconcave and angled toward the centerline. Tubeless tires mounted to the illustrative rims may achieve improved sealing performance due to an increased seating area of the rims. A shape and angle of the flanges may shape the tire to achieve an aerodynamic wheel profile.

26 Claims, 7 Drawing Sheets

(56) References Cited

U.S. PATENT DOCUMENTS

2014/0132060 A1* 5/2014 Chen .................... B60B 21/106
                                                                            301/95.104

OTHER PUBLICATIONS

Benlui (India) International, rims, Oct. 19, 2006, viewed at http://www.benluiindia.com/cycleparts9.html.
Unknown, aluminum rim record R 28 5/8 polished, circa 2015, viewed at https://www.ilovebike.it/en/circles/circle-in-aluminum-record-r-28-5-8-polished/.
Unknown, circle chromed steel R 28 5/8, circa 2015, viewed at https://www.ilovebike.it/en/circles/circle-in-steel-chrome-r-28-5-8/.
Unknown, traditional/steel bicycle wheel rims, Feb. 6, 2015, viewed at https://www.dutchbikebits.com/traditional bicycle-wheel-rims.
Gursam International, rims, Apr. 25, 2015, viewed at http://www.gursam.com/rims.html.
Section on Straight-Side Rims, Rims—Cycles and Mopeds, standards and manual regarding the international standard for labeling the size of bicycle tires and rims, published 2003, p. 254, European Tyre and Rim Technical Organisation (ETRTO).
Ryde Rims, V38 rims, viewed at https://www.ryde.nl/v38, products were commercially available prior to the filing date of the instant application, circa before Dec. 19, 2017.

* cited by examiner

ROAD TUBELESS BICYCLE WHEEL

CROSS-REFERENCES

This application claims the benefit under 35 U.S.C. § 119(e) of the priority of U.S. Provisional Patent Application Ser. No. 62/595,468, filed Dec. 6, 2017, the entirety of which is hereby incorporated by reference for all purposes.

INTRODUCTION

Tubeless tires, which are pneumatic tires that do not require an inner tube, have gained popularity with bicyclists over the past several years, beginning with the mountain bike community. Unlike tubed tires, tubeless tires mate with inner flanges of the wheel rim, and have a rib running along the bead which is seated against the flanges by air pressure. Typically, rims for tubeless tires also have a sealing member along the outer circumference to block air from escaping through spoke holes, etc.

The absence of an inner tube in a tubeless tire results in an elimination of so-called pinch flats, which occur when the inner tube is pinched against the rim. Because of this, a lower air pressure can be used without increasing risk of a flat tire, thereby improving traction. However, although tubeless tires are popular among mountain bike riders, the higher relative weight of the tires has resulted in a lower acceptance level among road bicyclists. Road tubeless tires and rims (i.e., for road bicycles) have nevertheless enjoyed increasing use among riders who prioritize the benefits of fewer flats and lower tire pressure over the increased weight. This group most notably includes cyclocross participants. However, the higher inflation pressure of road tires as compared to mountain bike tires results in a greater likelihood of the tubeless tires blowing off their rims. Accordingly, a need exists for a more secure and easy to use road tubeless rim.

SUMMARY

The present disclosure provides systems, apparatuses, and methods relating to road tubeless bicycle wheels. In some embodiments, a bicycle rim for tubeless tires according to the present teachings may include a rim body having a centerline and an axis of rotation; and an outer portion of the rim body including a circumferential tire mounting surface including: a pair of flat bead seats oriented generally parallel to the axis of rotation and circumferential to the rim body, wherein the bead seats are separated laterally by a central recess; and a pair of circumferential flanges each extending generally radially from the respective flat bead seat and having an inboard perimeter extending from the flat bead seat to an outer diameter of the tire mounting surface; wherein a respective nonconcave seating surface extends along a majority of the inboard perimeter of each of the circumferential flanges, each of the seating surfaces being angled, from an inner end to an outer end, toward the centerline.

In some embodiments, a bicycle rim according to the present teachings may include: a hoop having a rotational axis and a circumferential outer face oriented generally parallel to the rotational axis; and first and second circumferential flanges extending generally radially from opposing outboard edges of the outer face; wherein an inboard perimeter of each of the circumferential flanges includes an inwardly-angled, nonconcave tire seating surface extending along at least a majority of a distance from an outer diameter of the flange to the outer face of the hoop.

In some embodiments, a bicycle wheel in accordance with the present teachings may include: a rim having a rotational axis and a circumferential outer face oriented generally parallel to the rotational axis, and first and second circumferential flanges extending generally radially from opposing outboard edges of the outer face, wherein an inboard perimeter of each of the circumferential flanges defines a path from the outer face to an outer diameter of the flange, and an inwardly-angled, nonconcave tire seating surface extends along a majority of the path, and wherein each of the tire seating surfaces is undercut by a circumferential recess between the tire seating surface and the adjacent outer face; and a tubeless tire mounted to the rim, wherein opposing outboard surfaces of the tire are sealed against respective ones of the nonconcave tire seating surfaces, and inner edges of opposing beads of the tire are sealed against the outer face.

Features, functions, and advantages may be achieved independently in various embodiments of the present disclosure, or may be combined in yet other embodiments, further details of which can be seen with reference to the following description and drawings.

DESCRIPTION

Figure 1:
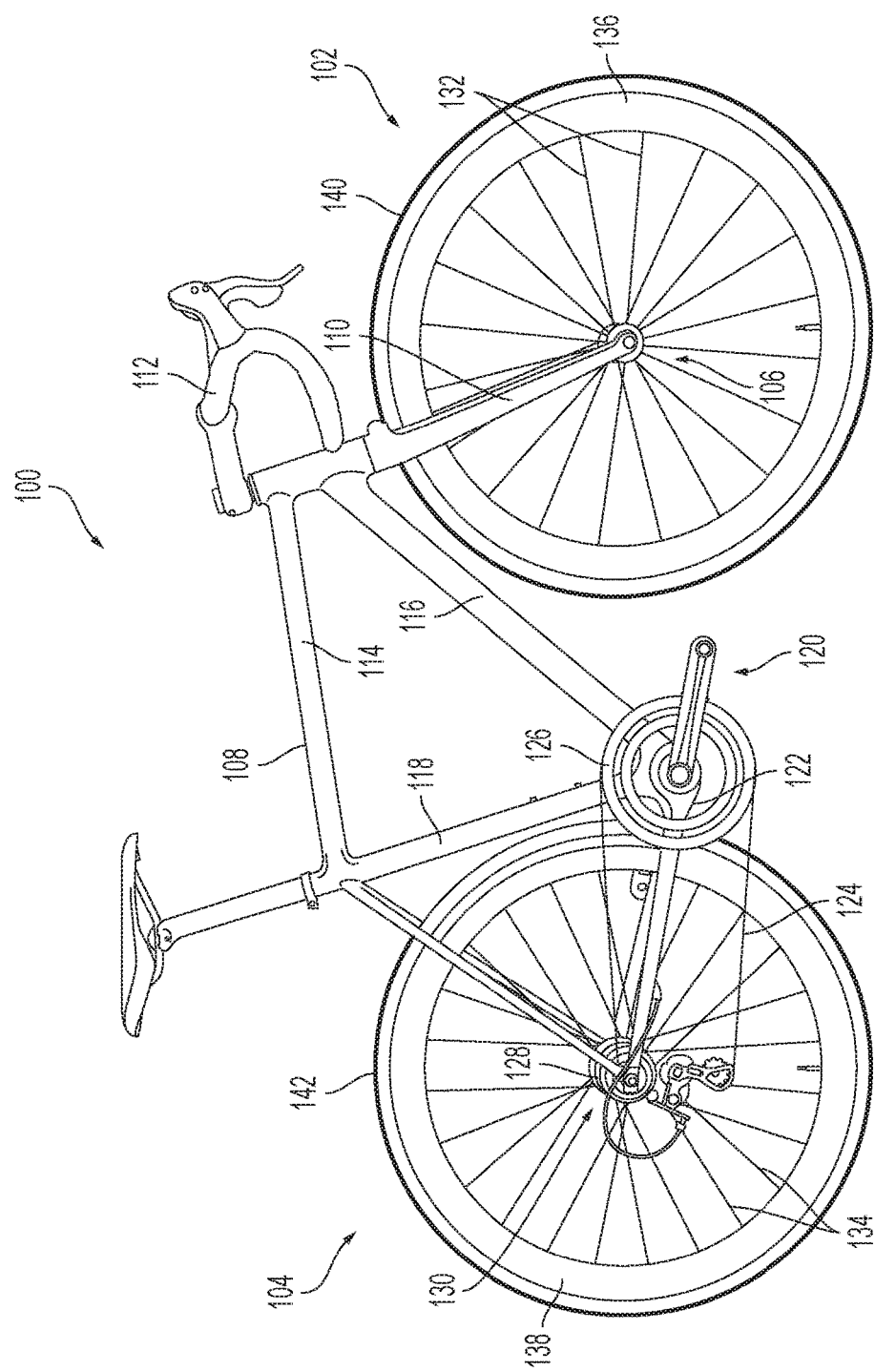
FIG. 1 is a side elevation view of an illustrative bicycle having wheels according to the present teachings.

Various aspects and examples of road tubeless bicycle wheels having improved tire retention, as well as related methods, are described below and illustrated in the associated drawings. Unless otherwise specified, a road tubeless bicycle wheel according to the present disclosure, and/or its various components, may, but are not required to, contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The directional terms "inboard," "outboard," "inner," and "outer" (and the like) are intended to be understood in the context of the wheel being described. For example, "outboard" may indicate a relative position that is laterally farther from the centerline of the wheel, or a direction that is away from the wheel centerline. Conversely, "inboard" may indicate a direction toward the centerline, or a relative position that is closer to the centerline. Similarly, "outer" means farther or away from the axis of wheel rotation, and "inner" means closer or toward the axis of wheel rotation.

The terms "radial" and "axial" (and the like) are intended to have their standard meanings and to be understood in the context of the wheel being described, where "axial" corresponds to the axis of rotation and "radial" corresponds to a radius of the wheel.

"Coupled" means connected, either permanently or releasably, whether directly or indirectly through intervening components.

Overview

In general, a road tubeless bicycle wheel according to the present teachings may include a rim having a circumferential tire mounting surface with opposing lateral flanges. A tubeless tire may be coupled to the tire mounting surface by inserting beads of the tire inboard of the lateral flanges. The rim has a pair of bead seats that run around an outer surface of the rim and are oriented substantially parallel to the rim's axis of rotation. Each of the lateral flanges has an inboard tire seating surface that takes up a majority of the inboard wall. Outer ends of these inboard tire seating surfaces are angled toward each other, such that the lateral flanges are closer together toward the outer diameter of the rim. Accordingly, the seating surfaces may be described as tapered or drafted. Additionally, the inboard tire seating surfaces are nonconcave (e.g., convex) and are configured to shape the tire such that the width of the inflated tire is substantially similar to the maximum width of the rim. In some examples, a tangent line between the maximum lateral points on the tire and the rim will have no greater than about four degrees of inclination from vertical. This creates a more aerodynamic wheel.

Examples, Components, and Alternatives

The following sections describe selected aspects of exemplary road tubeless bicycle wheels as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Bicycle

As shown in FIG. 1, this section describes an illustrative bicycle 100 suitable for use with the road tubeless wheels and rims disclosed herein. Bicycle 100 is for illustration only, and does not represent the only style or arrangement possible.

Bicycle 100 includes a front wheel 102 and a rear wheel 104. Front wheel 102 is rotatable about a front hub 106, which is coupled to a frame 108 of bicycle 100 by a front fork 110. Front wheel 102 is steerable by handlebars 112. Frame 108, in this example, includes a top tube 114, a down tube 116, and a seat tube 118, forming a front triangle. In some examples, one or more of the front triangle elements may be combined or absent. A drive train is coupled to the frame, specifically including a crankset 120 rotatably coupled to a bottom bracket 122 and configured to drive a chain 124 via one or more front chain rings 126 and a rear cassette 128.

Rear cassette 128 includes one or more gears coupled to a rear hub 130 of rear wheel 104. Front wheel 102 and rear wheel 104 each include a plurality of spoke members 132, 134 connecting a rim 136, 138 to the hub (106, 130), and a tubeless tire 140, 142 mounted to an outer portion of the rim.

B. Illustrative Rim

Figure 2:
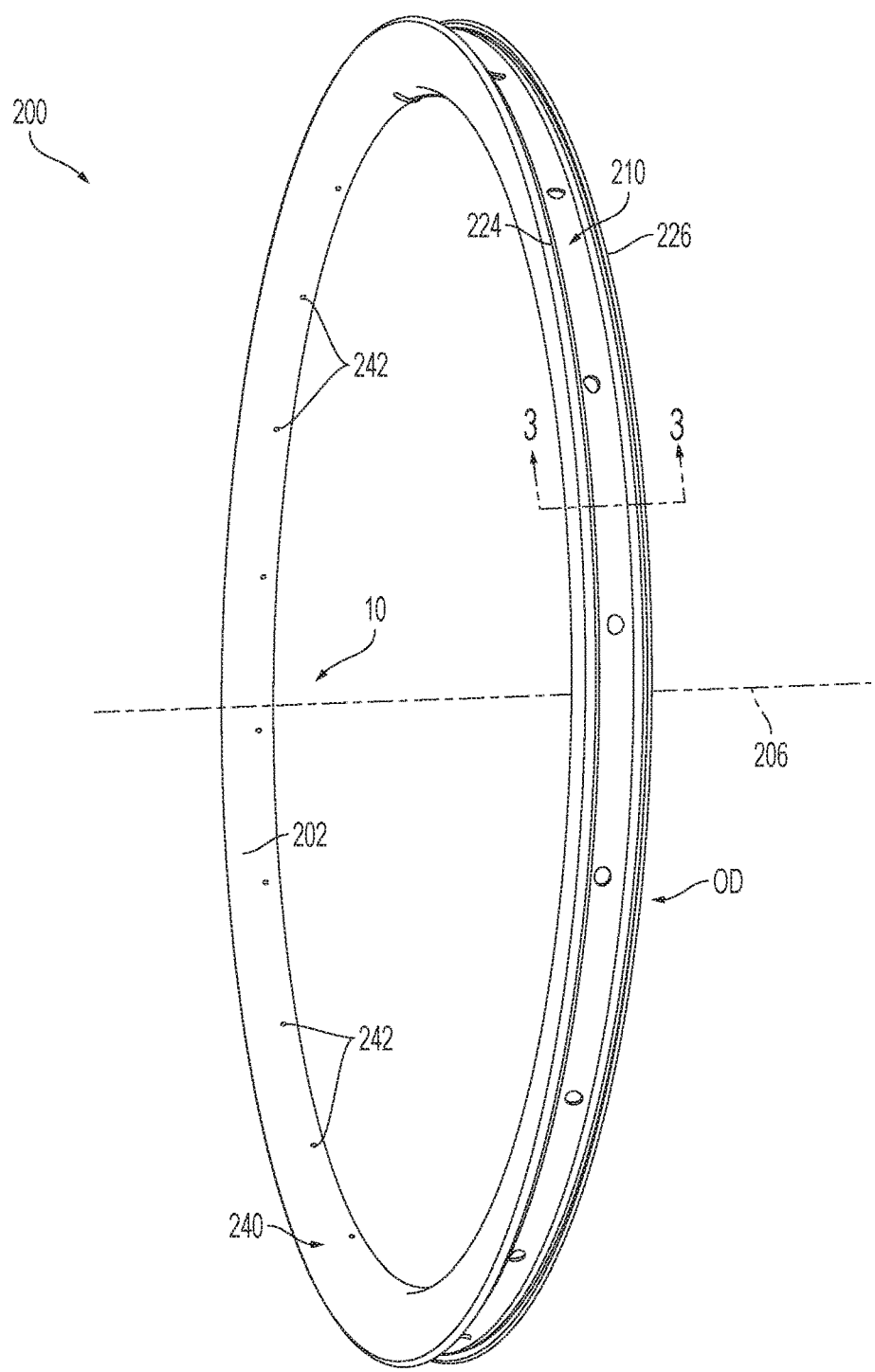
FIG. 2 is an isometric view of an illustrative rim in accordance with aspects of the present disclosure.
Figure 3:
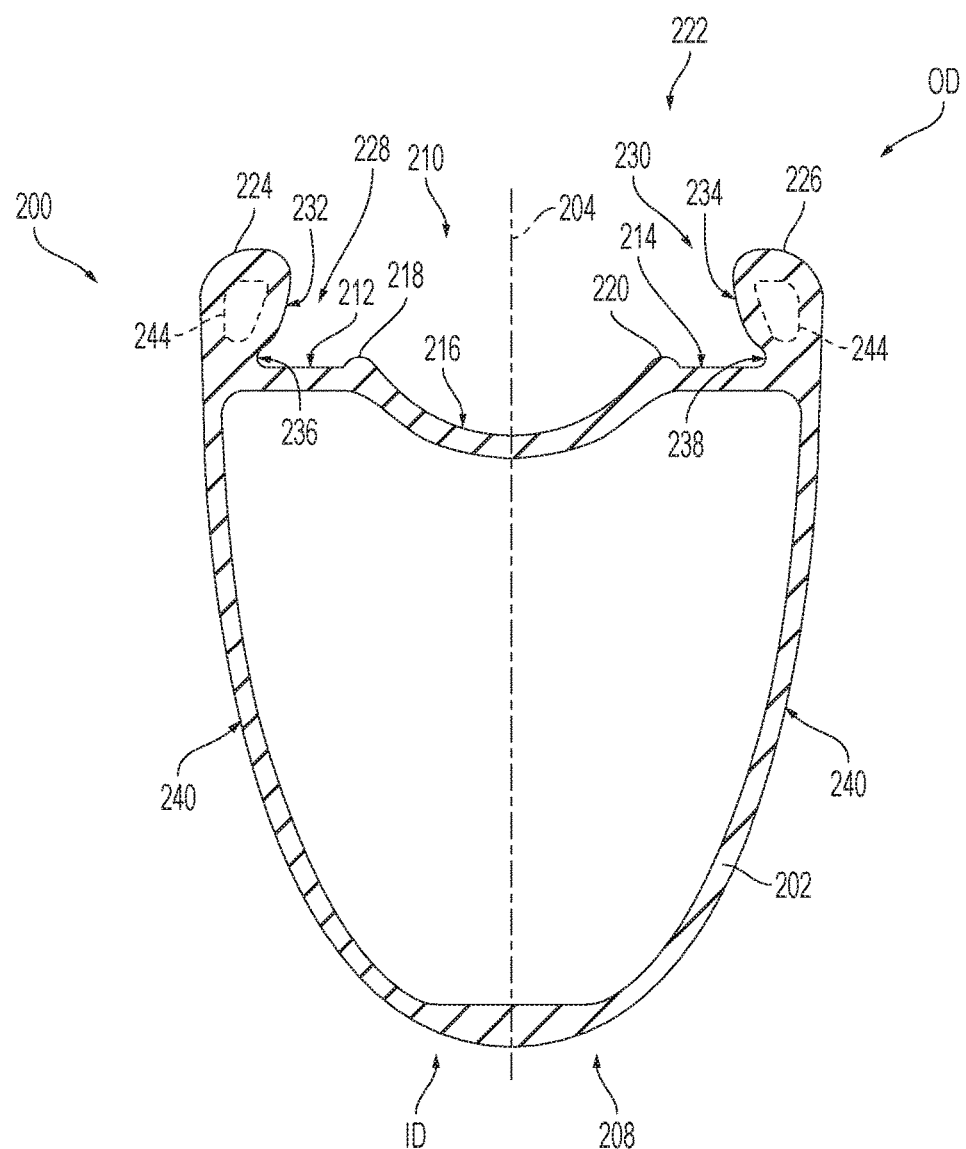
FIG. 3 is a sectional view of the rim of FIG. 2, taken at line 3-3.
Figure 4:
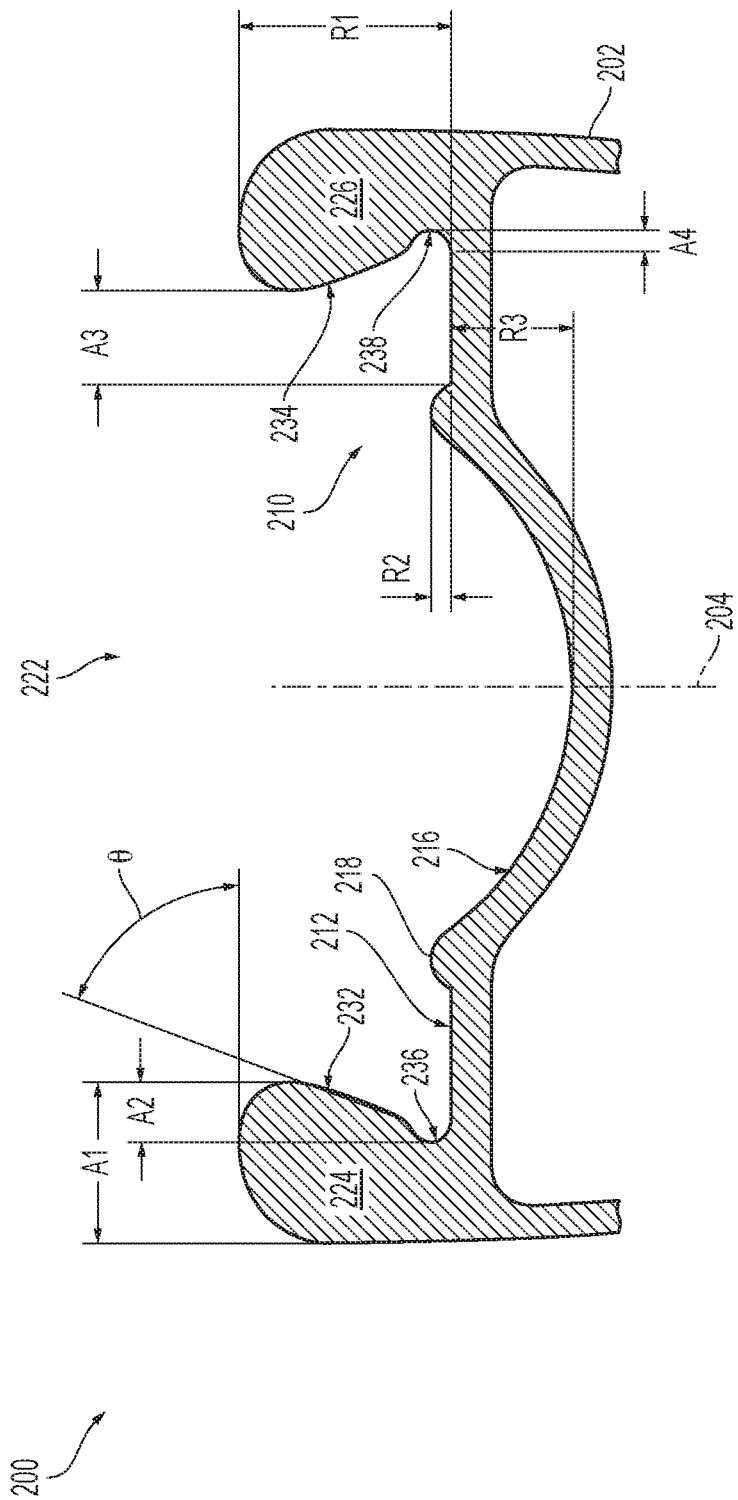
FIG. 4 is a magnified sectional view of an outer portion of the rim of FIG. 2.
Figure 5:
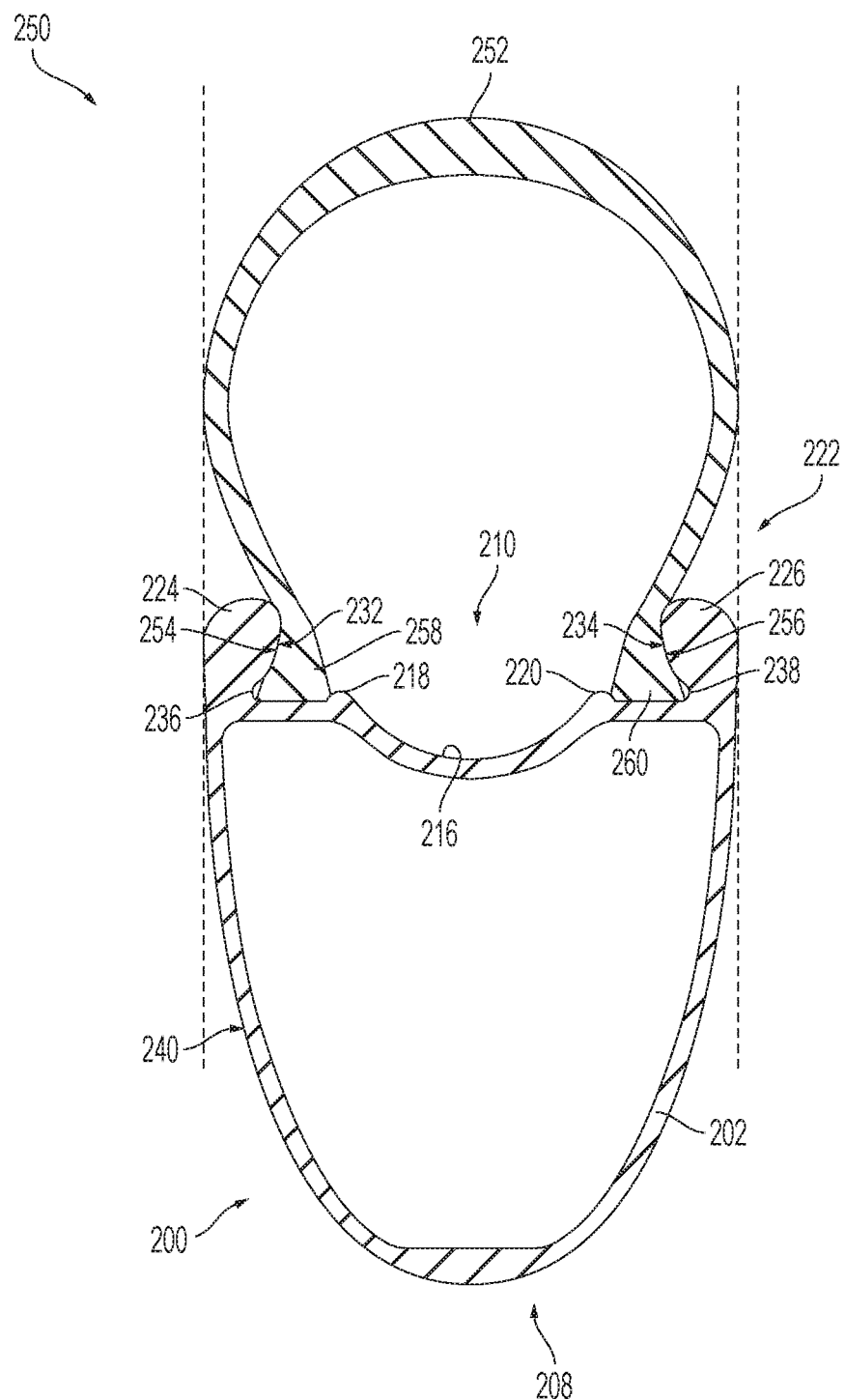
FIG. 5 is a sectional view of the rim of FIG. 2 having an illustrative tire installed thereon.
Figure 6:
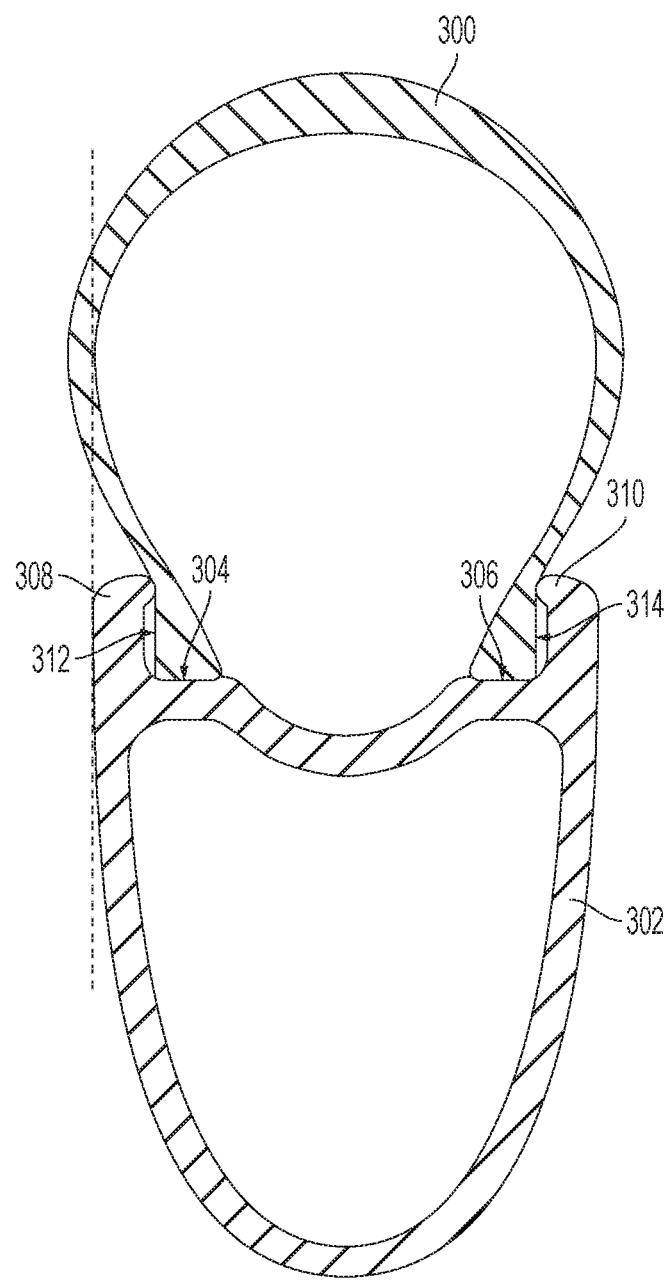
FIG. 6 is a sectional view of a different illustrative rim having another illustrative tire installed thereon.
Figure 7:
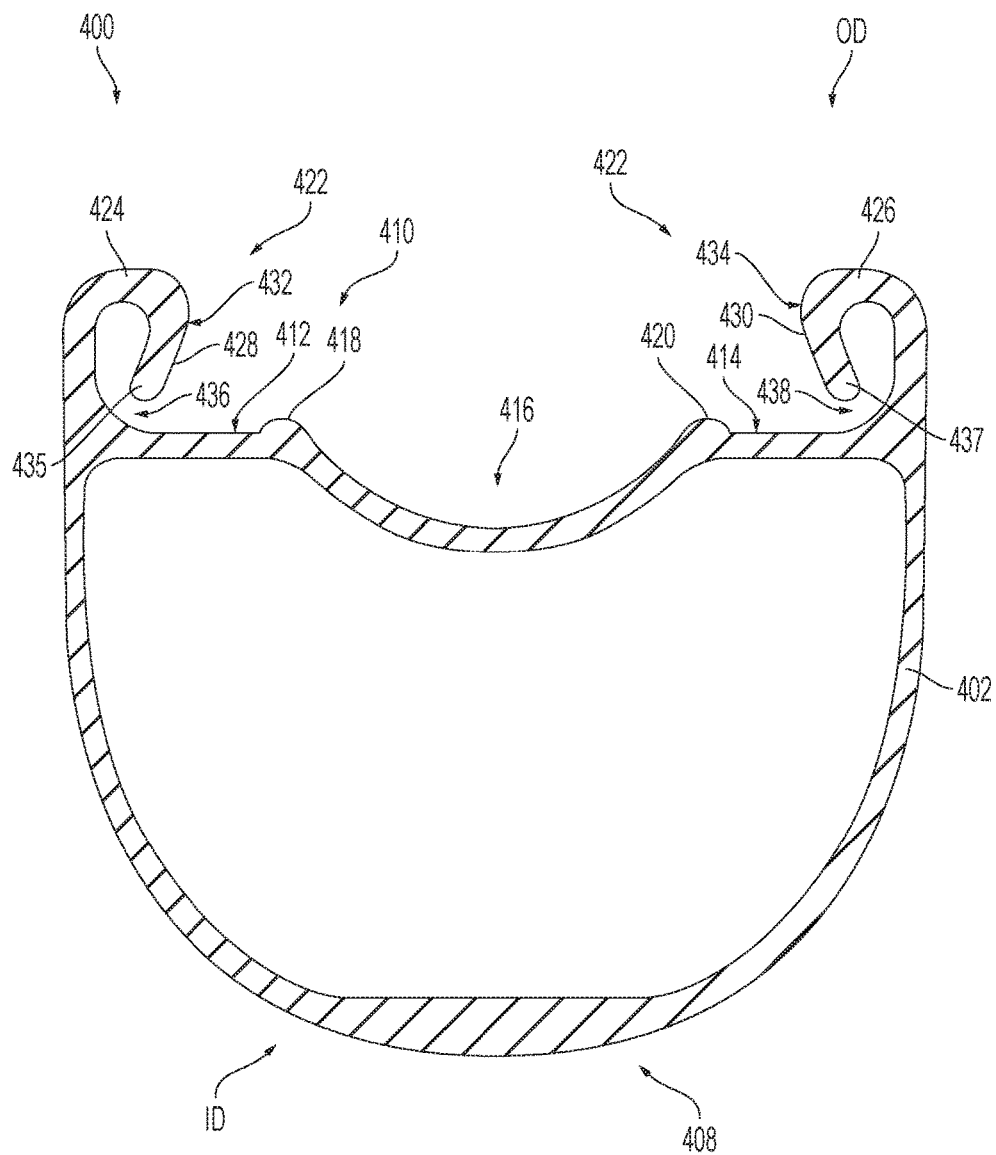
FIG. 7 is a sectional view of another illustrative rim in accordance with aspects of the present disclosure.

With reference to FIGS. 2-7, this section describes two illustrative road tubeless rims 200 and 400. Rims 200 and 400 are examples of the rims (e.g., rims 136, 138), described above. FIG. 2 is an isometric view of rim 200; FIG. 3 is a sectional view of rim 200, taken at cut line 3-3; FIG. 4 is a magnified view of a tire mounting surface of rim 200; and FIG. 5 is a sectional view of rim 200 with an illustrative tubeless tire mounted thereon. FIG. 6 is a similar sectional view of the tubeless tire mounted on a known crochet-type rim, illustrating differences as compared to rims of the present disclosure. FIG. 7 is a sectional view of rim 400 (similar to FIG. 5).

Rim 200 includes an annular rim body 202, also referred to as a hoop or hoop portion of the rim, and defines a centerline 204 and axis of rotation 206. Rim body 202, which may be hollow or solid, extends from a base portion 208 at an inner diameter (ID) to a circumferential outer face 210. Outer face 210 is oriented generally parallel to axis 206, such that the outer face is substantially horizontal when viewed in cross section (see FIG. 3). Outer face 210 includes a pair of flat bead seats 212, 214 (also referred to as bead seating surfaces, tire bead seats, and/or the like), which are configured to mate or otherwise engage with the bead of a tubeless tire (see FIG. 5). Flat bead seats 212 and 214 are separated laterally by a central recess 216, which is a circumferential depression formed in outer face 210. Central recess or depression 216 is bordered by a pair of ridges 218, 220 (also referred to as raised bands), which in combination with recess 216 facilitate initial mounting and pressurization of the tire (see description below).

The outer portion of rim body 202 includes a tire mounting surface 222 configured to securely receive and hold a road tubeless tire. Tire mounting surface 222 includes a first circumferential flange 224 and a second circumferential flange 226, each extending in a generally radial direction from the outboard edge of an adjacent bead seat (i.e., bead seat 212 for flange 224 and bead seat 214 for flange 226). Flanges 224 and 226 may be referred to as walls, lips, or protrusions, and may include any suitable structure configured to securely interface with outboard portions of the tire (see FIG. 5).

Each of the circumferential flanges has a shaped inboard perimeter 228, 230 extending from the flat bead seat to an outer diameter (OD) of tire mounting surface 222. In this example, inboard perimeters 228 and 230 each have a tire mating portion and an undercut portion. Specifically, a respective nonconcave (e.g., convex or flat) seating surface 232, 234 extends along a majority of inboard perimeter 228, 230 of each of the circumferential flanges. Each of the seating surfaces is angled, from an inner end to an outer end, toward centerline 204. In other words, the nonconcave tire seating surfaces are angled toward each other, such that each seating surface forms an acute angle $\theta$ relative to rotational axis 206.

Between the seating surfaces and the flat bead seats, the undercut portions each include a concave surface 236, 238 extending along a minority of the inboard perimeter of each of the circumferential flanges. Concave surface 236, 238 undercuts the tire seating surface, forming a circumferential recess between the tire seating surface and the adjacent outer face of the hoop. Each of the nonconcave seating surfaces 232, 234 transitions continuously from respective circumferential recess 236, 238 toward the outer diameter of the circumferential flange. As shown in FIGS. 3 and 4, a transition point between the nonconcave seating surface and the circumferential recess is blunted by the angle and respective curvatures of the two surfaces. This facilitates the prevention of damage to a mounted tire that may otherwise occur if a sharp edge were to be formed between the two portions of the flange.

As depicted in FIG. 3, either or both of circumferential flanges 224 and 226 may optionally include a hollow 244. Hollows 244 may include any suitable enclosed cavity or cavities on the interior of the flanges. In some examples, each hollow 244 is circumferential and continuous, such that the flange forms a circular tube. In some examples, each hollow has one or more breaks or discrete portions, such that a plurality of cavities exists within the flange.

Body 202 of rim 200 also includes an exterior wall 240 extending continuously from base portion 208 to the first and second circumferential flanges 224, 226. Circumferential flanges 224, 226 extend continuously from the exterior wall, forming an aerodynamic profile. Although an aerodynamic profile is shown in the drawings, exterior wall 240 may have any suitable dimensions and/or shape.

With reference to FIG. 2, a plurality of spoke holes 242 are formed in exterior wall 208, to facilitate connection of the rim to a hub (e.g., hub 106, 130) by a corresponding plurality of spokes (e.g., spoke members 132, 134) to form a functional wheel. Because rim 200 is intended for use with tubeless tires, a sealing member (not shown) is included to block air escaping through spoke holes 242. For example, a rim strip may be temporarily or permanently affixed to outer face 210 to block any openings in an airtight manner. Although a spoke-style wheel is illustrated and described herein, any suitable style of hub connection may be used with rim 200. For example, disc-type wheels and/or wheels with more or fewer spokes may be utilized with rim 200.

Turning to FIG. 4, various dimensions of the features described above will now be described in further detail with respect to a specific embodiment of rim 200. Each of the circumferential flanges 224, 226 has a radial height R1 above outer face 210. In the example depicted in FIG. 4, R1 is equal to approximately 5.2 millimeters (mm). Ridges 218 and 220 each have a radial height R2 above flat bead seats 212, 214. In the example depicted in FIG. 4, R2 is approximately 0.5 mm. Central recess 216 between the two ridges has a radial depth R3 below the flat bead seats. In the example depicted in FIG. 4, R3 is approximately 3.0 mm.

In the axial direction, flanges 224 and 226 each have a maximum width A1. In the example depicted in FIG. 4, A1 is approximately 4.0 mm. Each of the flanges also overhangs outer face 210 by an axial amount A2. In the example depicted in FIG. 4, axial overhang A2 is approximately 1.5 mm. A third axial distance A3 may be measured from the inboard-most point of each of the flanges to an outboard edge of the nearest circumferential ridge, as shown in FIG. 4. In the example depicted in FIG. 4, A3 is approximately 2.3 mm. Finally, each concave circumferential recess 236, 238 has an axial depth A4. In the example depicted in FIG. 4, A4 is approximately 0.5 mm.

Various surfaces of the circumferential flanges are also curved. In the example depicted in FIG. 4, outer ends of the flanges are rounded off, and the inner perimeters comprise at least two circular curves each having a different radius of curvature. Specifically, nonconcave surfaces 232 and 234 are each convex in this example, with a radius of curvature of approximately 10.0 mm. Smaller concave surfaces 236 and 238 each have a radius of curvature of approximately 0.5 mm.

Finally, angle $\theta$ is an acute angle with respect to axis 206, as shown in FIG. 4. In general, angle $\theta$ may have any value in the range of approximately 60 degrees to approximately 80 degrees. In some examples, angle $\theta$ is within a range of approximately 60 degrees to approximately 71 degrees. In some examples, angle $\theta$ is approximately 70 degrees. In the example depicted in FIG. 4, angle $\theta$ is approximately 70.1 degrees.

Turning now to FIG. 5, a road tubeless wheel 250 may include rim 200, substantially as described above, with a tubeless tire 252 mounted to the rim. As shown in FIG. 5, opposing outboard surfaces 254, 256 of tire 252 are sealed against respective ones of the nonconcave tire seating surfaces (i.e., surfaces 232, 234). Inner edges of opposing beads 258 and 260 of the tire are sealed against the outer face. Specifically, bead 258 seats and seals against bead seat 212, and bead 260 seats and seals against bead seat 214. This creates a large collective sealing surface between tire 252 and rim 200, and a much greater sealing surface than would be present if a standard crochet-style rim were to be used. For comparison, a substantially identical tire 300 is depicted in FIG. 6, mounted on a standard crochet-style rim 302. As shown, tire 300 seals against a pair of bead seats 304 and 306, and against a relatively small sealing surface at the tips of inboard-facing hook structures 308 and 310 of the rim flanges. This leaves a substantial gap at outboard surfaces 312 and 314 of the tire.

Returning to FIG. 5, rim 200 of wheel 250 is configured to shape tire 252 aerodynamically, such that the tire is at most only slightly wider than the rim. As shown, an imaginary tangent line drawn from a widest exterior portion of the rim to a widest portion of the tire does not exceed approximately four degrees from vertical. In the example depicted in FIG. 5, the rim has a maximum lateral width, and the tubeless tire has an inflated lateral width, such that the inflated lateral width of the tubeless tire is constrained by the circumferential flanges of the rim to be no greater than the maximum lateral width of the rim.

A method for mounting tire 252 on rim 200 includes placing beads 258 and 260 into central recess 216 of outer face 210, such that the beads are substantially seated against the recess surface and prevented from expansion in an outboard direction by abutting ridges 218 and 220. Pressurizing air is then introduced into the tire through rim 200, expanding the tire until beads 258 and 260 overcome the confines of ridges 218 and 220, moving into position against flat bead seats 212 and 214, with outboard surfaces 254 and 256 of the tire sealed against inboard seating surfaces 232 and 234. As pressure continues to rise within tire 252, the perimeter and orientation of flanges 224 and 226 shape tire 252 such that the tire does not excessively expand beyond the width of the rim. Concave surfaces of circumferential recesses 236 and 238 permit outer corners of beads 258 and 260 to expand laterally into the available space, further allowing the tire surface to conform to the adjacent nonconcave seating surfaces, thereby improving the seal.

Turning now to FIG. 7, rim 400 is depicted in cross section. Similar to rim 200, this rim includes a body 402 extending from a base portion 408 to an outer face 410 at the outer diameter. Outer face 410 is oriented generally parallel to the rim's axis of rotation, such that the outer face is substantially horizontal in the cross sectional view of FIG. 7. Outer face 410 includes a pair of flat bead seats 412, 414 (also referred to as bead seating surfaces, tire bead seats, and/or the like), which are configured to mate or otherwise engage with the bead of a tubeless tire (similar to FIG. 5). As described with respect to rim 200, flat bead seats 412 and 414 are separated laterally by a central recess 416, which is a circumferential depression formed in outer face 410. Central recess 416 is bordered by a pair of ridges 418, 420 (also referred to as raised bands).

The outer portion of rim body 402 includes a tire mounting surface 422 configured to securely receive and hold a road tubeless tire. Tire mounting surface 422 includes a first circumferential flange 424 and a second circumferential flange 426, each extending in a generally radial direction from the outboard edge of an adjacent bead seat. Flanges 424 and 426 may include any suitable structure configured to securely interface with outboard portions of the tire. In this example, flanges 424 and 426 comprise respective walls curled toward the centerline of the rim, each forming an open loop.

Each of the circumferential flanges has a shaped inboard perimeter 428, 430 extending from a gap 436, 438 adjacent the flat bead seat to an outer diameter (OD) of tire mounting surface 422. In this example, inboard perimeters 428 and 430 each have a tire mating portion terminating at a distal end 435, 437 spaced from the outer face of the rim. Specifically, a respective nonconcave (e.g., convex or flat) seating surface 432, 434 extends along a majority of inboard perimeter 428, 430 of each of the circumferential flanges. Each of the seating surfaces is angled, from an inner end to an outer end, toward the centerline. In other words, the nonconcave tire seating surfaces are angled toward each other, such that each seating surface forms an acute angle relative to the rotational axis, substantially as described with respect to rim 200. Similar in function to the blunted transition between the nonconcave and concave portions of rim 200, distal ends 435, 437 are rounded. This facilitates the prevention of damage to a mounted tire that may otherwise occur if a sharp edge were to be formed.

Between the seating surfaces and the flat bead seats, gaps 436, 438 effectively undercut the tire seating surface, causing the circumferential recess to include a circumferential opening between the tire seating surface and the adjacent outer face of the hoop. As described regarding the concave surfaces of circumferential recesses 236 and 238, the circumferential opening of gaps 436 and 438 permit outer corners of tire beads 258 and 260 to expand laterally into the available space, further allowing the tire surface to conform to the adjacent nonconcave seating surfaces and improving the seal.

Advantages, Features, Benefits

The different embodiments and examples of the road tubeless bicycle wheels and rims described herein provide several advantages over known solutions for mounting and securing road tubeless tires to corresponding rims. For example, illustrative embodiments and examples described herein facilitate easier seating of the tire beads during inflation. Traditional rim/tire interfaces require a high pressure (e.g., 120-260 psi) and/or a two-stage floor pump to seat the tire beads. The disclosed rims may be inflated and seated by a standard floor pump (e.g., 60-120 psi) or even a hand pump.

Additionally, and among other benefits, examples and embodiments disclosed herein may provide a longer sealing time. For example, disclosed rims may maintain a proper seal for fourteen days as opposed to two to three days for a traditional design.

Additionally, and among other benefits, examples and embodiments disclosed herein may provide a higher level of safety. The stated maximum tire pressure of tubeless tires is typically in the range of 100 psi. The standard overpressure/blow-off test is 1.6× (i.e., 160 psi) for safety. Examples disclosed herein may accommodate over 2.3× (i.e., 230 psi) without failure. Note that a blow-off test involves inflating a tire with water in an enclosed chamber until the tire beads lift off the rim hooks.

Additionally, and among other benefits, examples and embodiments disclosed herein may provide better aerodynamics. As stated above, the disclosed rims may maintain proper aerodynamics of the tire (e.g., not inflating wider than rim) while also providing superior mechanical locking of the tire bead.

Additionally, and among other benefits, examples and embodiments disclosed herein may provide an easier mounting process. Presently, the standard ETRTO (European Tyre and Rim Technical Organisation) side wall height is 6 mm to provide adequate mechanical locking. This also makes the tire very difficult to mount. Rims disclosed herein have superior bead locking that allows for side wall (i.e., flange) heights of 5.2 mm, thus making it easier to mount the tires with just tire levers or even hands only.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A bicycle rim for tubeless tires, the rim comprising:
a rim body having a centerline and an axis of rotation; and
an outer portion of the rim body including a circumferential tire mounting surface including:
a pair of bead seats oriented generally parallel to the axis of rotation and circumferential to the rim body, wherein the bead seats are separated laterally by a central recess; and
a pair of circumferential flanges each extending generally radially from the respective bead seat and having an inboard perimeter extending from proximate the bead seat to a rounded outer diameter of the tire mounting surface;
wherein a respective convex seating surface extends along a majority of the inboard perimeter of each of the circumferential flanges, each of the seating surfaces being angled, from an inner end to an outer end, toward the centerline;
wherein a respective concave surface extends along a minority of the inboard perimeter of each of the circumferential flanges between the bead seat and the convex seating surface; and
wherein the inboard perimeter has a radius of curvature larger at the convex seating surface than at the concave surface, and the radius of curvature decreases as the inboard perimeter extends from the convex seating surface toward the rounded outer diameter of the tire mounting surface.

2. The rim of claim 1, wherein each of the convex seating surfaces transitions continuously from the respective concave surface toward the outer diameter of the tire mounting surface.

3. The rim of claim 1, wherein the radius of curvature at the concave surface is no greater than approximately 1.0 millimeter (mm).

4. The rim of claim 1, wherein each of the concave surfaces has a maximum axial depth no greater than approximately 0.5 mm.

5. The rim of claim 1, wherein the rim body comprises an exterior wall extending continuously from a base portion at an inner diameter of the rim to the tire mounting surface.

6. The rim of claim 5, wherein the pair of circumferential flanges extend continuously from the exterior wall.

7. The rim of claim 1, wherein each of the seating surfaces defines an acute angle greater than approximately sixty degrees with respect to the axis of rotation.

8. A bicycle rim comprising:
a hoop having a rotational axis and a circumferential outer face oriented generally parallel to the rotational axis; and
first and second circumferential flanges extending generally radially from opposing outboard edges of the outer face;
wherein an inboard perimeter of each of the circumferential flanges includes an inwardly-angled, convex tire seating surface extending along at least a majority of a distance from a rounded outer diameter of the flange to the outer face of the hoop;
wherein each of the convex tire seating surfaces is undercut by a circumferential concave recess between the tire seating surface and the adjacent outer face of the hoop; and
wherein the inboard perimeter has a radius of curvature larger at the convex tire seating surface than at the concave recess, and the radius of curvature decreases as the inboard perimeter extends, in a direction generally away from the circumferential outer face, from the convex tire seating surface toward the rounded outer diameter of the flange.

9. The bicycle rim of claim 8, wherein the circumferential concave recess has a maximum radial dimension of approximately 1.0 mm.

10. The bicycle rim of claim 8, wherein each circumferential concave recess comprises a gap between the tire seating surface and the adjacent outer face of the hoop.

11. The bicycle rim of claim 10, wherein each of the circumferential flanges comprises a wall curled toward a centerline of the rim.

12. The bicycle rim of claim 11, wherein each of the circumferential gaps is formed by a distal end of the respective wall being spaced from the outer face of the hoop.

13. The bicycle rim of claim 8, wherein each of the flanges has a radial height above the outer face equal to approximately 5.2 mm.

14. The bicycle rim of claim 8, wherein the outer face of the hoop comprises a pair of bead seating surfaces separated by a circumferential central depression.

15. The bicycle rim of claim 8, wherein outer ends of the convex tire seating surfaces are angled toward each other, such that each seating surface forms an acute angle relative to the rotational axis.

16. The bicycle rim of claim 15, wherein the acute angle is between approximately 60 degrees and approximately 80 degrees.

17. The bicycle rim of claim 16, wherein the acute angle is approximately 70 degrees.

18. The bicycle rim of claim 8, wherein each of the circumferential flanges includes an internal cavity.

19. A bicycle wheel comprising:
a rim having a rotational axis and a circumferential outer face oriented generally parallel to the rotational axis, and first and second circumferential flanges extending generally radially from opposing outboard edges of the outer face, wherein an inboard perimeter of each of the circumferential flanges defines a path from the outer face to a rounded outer diameter of the flange, and an inwardly-angled, convex tire seating surface extends along a majority of the path, and wherein each of the tire seating surfaces is undercut by a circumferential recess between the tire seating surface and the adjacent outer face; and
a tubeless tire mounted to the rim, wherein opposing outboard surfaces of the tire are sealed against respective ones of the convex tire seating surfaces, and inner edges of opposing beads of the tire are sealed against the outer face;
wherein the inboard perimeter of the flange has a radius of curvature larger at the convex tire seating surface than at the circumferential recess, and the radius of curvature decreases as the inboard perimeter extends from the convex tire seating surface toward the rounded outer diameter of the flange.

20. The wheel of claim 19, wherein an imaginary tangent line from a widest exterior portion of the rim to a widest portion of the tire does not exceed approximately four degrees from vertical.

21. The wheel of claim 19, wherein the radius of curvature at the circumferential recess is no greater than approximately 1.0 mm.

22. The wheel of claim 19, wherein each of the flanges has a radial height above the outer face equal to approximately 5.2 mm.

23. The wheel of claim 19, wherein the outer face comprises a pair of bead seating surfaces separated by a circumferential central depression, such that the opposing beads of the tire are seated against respective ones of the bead seating surfaces.

24. The wheel of claim 19, wherein outer ends of the convex tire seating surfaces are angled toward each other, such that each seating surface forms an acute angle of approximately 70 degrees relative to the rotational axis.

25. The wheel of claim 19, wherein each circumferential recess comprises a gap between the tire seating surface and the adjacent outer face of the rim, and wherein each of the circumferential flanges comprises a wall curled toward a centerline of the rim, such that each of the circumferential gaps is formed by a distal end of the respective wall being spaced from the outer face of the rim.

26. The wheel of claim 19, wherein a respective one of the beads of the tire extends into each circumferential recess.

\* \* \* \* \*